United States Patent
Huang et al.

(10) Patent No.: US 10,223,005 B2
(45) Date of Patent: Mar. 5, 2019

(54) PERFORMING MULTIPLE WRITE OPERATIONS TO A MEMORY USING A PENDING WRITE QUEUE/CACHE

(71) Applicant: Cisco Technology, Inc., San Jose, CA (US)

(72) Inventors: Wei-Jen Huang, Burlingame, CA (US); Chih-Tsung Huang, Burlingame, CA (US); Sachin Agarwal, Sunnyvale, CA (US); Sha Ma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/897,659

(22) Filed: Feb. 15, 2018

(65) Prior Publication Data

US 2018/0173436 A1 Jun. 21, 2018

Related U.S. Application Data

(62) Division of application No. 12/870,596, filed on Aug. 27, 2010, now Pat. No. 9,904,476.

(51) Int. Cl.

| | |
|---|---|
| *G06F 12/06* | (2006.01) |
| *G06F 13/16* | (2006.01) |
| *G06F 3/06* | (2006.01) |
| *G06F 12/0864* | (2016.01) |
| *G06F 11/10* | (2006.01) |
| *H04L 12/773* | (2013.01) |
| *H04L 12/741* | (2013.01) |

(52) U.S. Cl.
CPC .......... *G06F 3/0613* (2013.01); *G06F 3/064* (2013.01); *G06F 3/0656* (2013.01); *G06F 3/0659* (2013.01); *G06F 3/0674* (2013.01); *G06F 3/0679* (2013.01); *G06F 11/108* (2013.01); *G06F 12/06* (2013.01); *G06F 12/0864* (2013.01); *G06F 13/1642* (2013.01); *G06F 13/1673* (2013.01); *H04L 45/60* (2013.01); *H04L 45/745* (2013.01)

(58) Field of Classification Search
CPC ........ G06F 12/0844–12/0859; G06F 12/0864; G06F 13/1642; G06F 13/1673
USPC ..................................... 711/5, 138, 139, 168
See application file for complete search history.

(56) References Cited

U.S. PATENT DOCUMENTS

| | | |
|---|---|---|
| 6,671,781 B1 | 12/2003 | Worrell |
| 6,735,677 B1 | 5/2004 | Stewart |
| 8,250,328 B2 | 8/2012 | Farrell et al. |

(Continued)

OTHER PUBLICATIONS

David A. Patterson et al. Computer Architecture: A Quantitative Approach. 1996. Morgan Kaufmann. 2nd ed. pp. 372-483.*

(Continued)

*Primary Examiner* — Nathan Sadler
(74) *Attorney, Agent, or Firm* — Patterson + Sheridan, LLP (57) ABSTRACT

Techniques are described for a memory device. In various embodiments, a scheduler/controller is configured to manage data as it read to or written from a memory. A memory is partitioned into a group of sub-blocks, a parity block is associated with the sub-blocks, and the sub-blocks are accessed to read data as needed. A pending write buffer is added to a group of memory sub-blocks. Such a buffer may be sized to be equal to the group of memory sub-blocks. The pending write buffer handles collisions for write accesses to the same block.

14 Claims, 10 Drawing Sheets

(56) References Cited

U.S. PATENT DOCUMENTS

| | | |
|---|---|---|
| 9,904,476 B2 | 2/2018 | Huang et al. |
| 2005/0132146 A1 | 6/2005 | Kim et al. |
| 2006/0020764 A1 | 1/2006 | Kim et al. |
| 2008/0209129 A1 | 8/2008 | Van De Waerdt et al. |
| 2010/0161892 A1 | 6/2010 | Dama et al. |
| 2010/0318749 A1 | 12/2010 | Matthews |
| 2011/0167192 A1 | 7/2011 | Iyer et al. |
| 2011/0179200 A1 | 7/2011 | Sukonik et al. |

OTHER PUBLICATIONS

Gal et al. "Algorithms and Data Structures for Flash Memories." Jun. 2005. ACM. ACM Computing Survyes. vol. 37. pp. 138-163.*
Jun Shao and Brian T. Davis. "A Burst Scheduling Access Reordering Mechanism." Feb. 2007. IEEE. HPCA '07., 10 pages.

* cited by examiner

PERFORMING MULTIPLE WRITE OPERATIONS TO A MEMORY USING A PENDING WRITE QUEUE/CACHE

TECHNICAL FIELD

Embodiments presented in this disclosure generally relate to memory management techniques, and more particularly, to increasing data access performance by creating additional ports or channels used to read to and write from a memory storage device.

BACKGROUND

Demand for memory bandwidth on network and switching devices continues to increase. For example, memory bandwidth needs to keep pace with both increases in port density (i.e., with rapidly increasing system port counts) as well as with increases in port speeds (e.g., as port speeds migrate upwards from 1 Gb to 10 Gb to 40 Gb to 100 Gb). Higher density ports and higher speeds translate to larger and faster tables with correspondingly larger aggregate memory and I/O bandwidth requirements. For example, a network-switching device may use memory lookup tables for routing and forwarding network traffic. These tables may include hundreds-of-thousands of entries used for routing millions of network packets.

In these systems, a central processing unit (CPU) or other specialized circuitry (e.g., a field programmable gate array) is configured to route network data received on one port of the device to another port. Firmware running on the network device reads addresses from the lookup table to determine what port a given packet should be forwarded over (based on reading a destination address listed in the packet). As both port density and port speeds increase, the rate at which data can be read from the forwarding table (and from the packet in a buffer) is becoming a limiting factor in the throughput of some network and switching devices.

Further, increases in port density and link speeds also present heavy demands on the memory write capabilities of a networking device. For example, the network device may include buffers used to store a network packet received on one port prior to forwarding the packet out on another port. If the write speeds are insufficient to keep pace with the port speed (and increased port density), packet drops may occur. Similarly, the network device may be configured to write counters values (or other data) to memory for use in traffic monitoring, traffic shaping and for variety of other purposes. Thus, much like the speed at which memory reads occur, the speed at which memory writes occur is becoming a limiting factor for the performance of some network and switching devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Embodiments described herein include methods, systems and computer program products for increasing data access performance. One embodiment of the disclosure includes a method for performing multiple write operations in parallel. This method may generally include during a first read/write cycle, performing a first write operation by writing data to a first memory address in a first block of addresses, wherein the first block is one of a plurality of blocks. And also include, in parallel to the first write operation, performing a second write operation by writing data for a second memory address in the first block of addresses to a pending write queue/cache.

Another embodiment includes a method for performing multiple write operations, in parallel, to a set-associative memory. This method may generally include determining that a first and a second write operation are directed to a first block in the memory. The memory itself includes at least a plurality of blocks, a spare block and a tag table. This method may also include performing the first write operation by writing data to the first block at a first memory address. In parallel to performing the first write operation, a second block may be identified. The second block may be selected from the plurality of blocks and the spare block, excluding the first block. A second write operation may be performed by writing data to the second block at a second memory address, and the tag table may be updated to indicate the second write operation was performed by writing to the second block.

Another embodiment includes a method. This method may generally include, during a first read/write cycle, performing a first read/write operation by reading read data from one of (i) a pending write queue/cache if the read data is determined to be in the pending write queue/cache or (ii) a first memory address in a first block of addresses, wherein the first block is one of a plurality of blocks, if the read data is determined to not be in the pending write queue/cache. This method may also include, in parallel to the first read/write operation, performing a second read/write operation by writing data for a second memory address in the first block of addresses to a pending write queue/cache, in response to determining (i) the read data and the write data are in the first block of addresses and (ii) the first read data is determined to not be in the pending write queue/cache.

Still another embodiment includes a computer-readable storage medium storing code for execution by a central processing unit (CPU), wherein the code, when executed by the CPU, performs an operation for performing multiple write operations in parallel. The operation itself may generally include during a first read/write cycle, performing a first write operation by writing data to a first memory address in a first block of addresses, wherein the first block is one of a plurality of blocks. And also include, in parallel to the first write operation, performing a second write operation by writing data for a second memory address in the first block of addresses to a pending write queue/cache.

Yet another embodiment includes a computer-readable storage medium storing code for execution by a central processing unit (CPU), wherein the code, when executed by the CPU, performs an operation for performing multiple write operations, in parallel, to a set-associative memory. The operation itself may generally include determining that a first and a second write operation are directed to a first block in the set-associative memory. The set-associative memory includes at least a plurality of blocks, a spare block and a tag table. The operation may include performing the first write operation by writing data to the first block at a first memory address. In parallel to performing the first write operation, a second block may be identified. The second block may be selected from the plurality of blocks and the spare block, excluding the first block. A second write operation may be performed by writing data to the second block at a second memory address, and the tag table may be updated to indicate the second write operation was performed by writing to the second block.

Still another embodiment includes a system having a memory partitioned into a plurality of blocks and a memory controller configured to perform multiple write operations to the memory, in parallel. The operation itself may generally include during a first read/write cycle, performing a first write operation by writing data to a first memory address in a first block of addresses, wherein the first block is one of the plurality of blocks. And also include, in parallel to the first write operation, performing a second write operation by writing data for a second memory address in the first block of addresses to a pending write queue/cache.

Yet another embodiment includes a system having a set-associative memory partitioned into a plurality of blocks, including at least one spare block and a memory controller configured to perform multiple write operations, in parallel, to the set-associative memory. The operation itself may include determining that a first and a second write operation are directed to a first block in the set-associative memory. The set-associative memory includes at least a plurality of blocks, a spare block and a tag table. The operation may include performing the first write operation by writing data to the first block at a first memory address. In parallel to performing the first write operation, a second block may be identified. The second block may be selected from the plurality of blocks and the spare block, excluding the first block. A second write operation may be performed by writing data to the second block at a second memory address, and the tag table may be updated to indicate the second write operation was performed by writing to the second block.

Description of Example Embodiments

Embodiments described herein provide techniques for increasing data access performance for a memory device. In various embodiments, a scheduler/controller is configured to manage data access and data as read from or written to a memory. In one embodiment, read access is increased by partitioning a memory into a group of sub-blocks, associating a parity block with the sub-blocks, and accessing the sub-blocks to read data as needed. Data access is increased by allowing simultaneous reads to addresses within the same block to occur—data for one address being read from a sub-block in which the address is located, and data for a second address being read using the combination of the other sub-blocks and the parity block. Further, the memory may be partitioned (and parity blocks added) across n-dimensions. Doing so provides an n+1-fold read performance for completely random access (necessary for general-purpose applications) without introducing a throughput penalty due to access collisions.

Thus, embodiments may increase read performance without migrating to faster technology (with the associated timing, power and overhead and cost requirements) and/or duplicated hardware. Further, this approach is lossless and can work in synergy with error detection and correction methods and other optimizations. For example, this approach preserves data integrity and correction overheads and preserves RAID recovery properties used for restoring corrupted data.

In another embodiment, write speeds are improved by adding a pending write buffer to a group of memory sub-blocks. Such a buffer may be sized to be equal to the group of memory sub-blocks. The pending write buffer is used to handle collisions for accesses to the same block, allowing either two simultaneous writes or simultaneous read and write to any regular memory block to occur. This buffer serves as a pending write queue (and cache for reads that occur prior to a flush). In the context of some embodiments described herein, the memory stores a forwarding table used by a network device, and whether data is written to the actual memory block or in the pending write buffer depends on the address specified in either an SRAM storing tag information or a content addressable memory (CAM) lookup. The pending write buffer is sized to accommodate worst-case back-to-back collisions for accesses to the same block.

In still another embodiment, write speeds are improved through a set-associative organization of memory blocks. Write access is increased by partitioning memory into blocks, and associating an additional block of equal size with the primary data blocks in a set-associative manner. For example, if the set includes four blocks to which data for an address may be written, then a fifth, additional block is added. The five blocks form an associative set; providing an additional memory block ensures that a free block is always available when a write operation is performed. One application of this embodiment includes a set-associative cache used to buffer data in a memory (e.g., to buffer packets as they are received). Although applications are not limited to ones that are set-associative. For example, embodiments may be adapted for use with a First-in-First-Out (FIFO) data structure. Further still, in one embodiment, the increased write performance due to the set-associative mechanism is merged with the parity read buffer mechanism in order to multiply the speed of multiple read-modify-write operations. These operations are commonly performed in various networking operations; in particular, counters and dynamically updated tree type data structures.

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Further, a particular embodiment is described using a memory management unit on a network routing device configured to read from and/or write to a memory on the routing device. However, it should be understood that embodiments described herein may be adapted for a broad variety of memory or storage devices, including, e.g., DRAM, SRAM, or SDRAM memory modules (or other memory modules), disk drives, flash memory devices, or networked storage devices, etc. More generally, any memory or storage space that can be partitioned, logically or physically, into a group of blocks can be adapted to use the techniques described herein to increase read/write performance. Accordingly, references to the particular example of a memory management device on a network routing device are included to be illustrative and not limiting.

Figure 1:
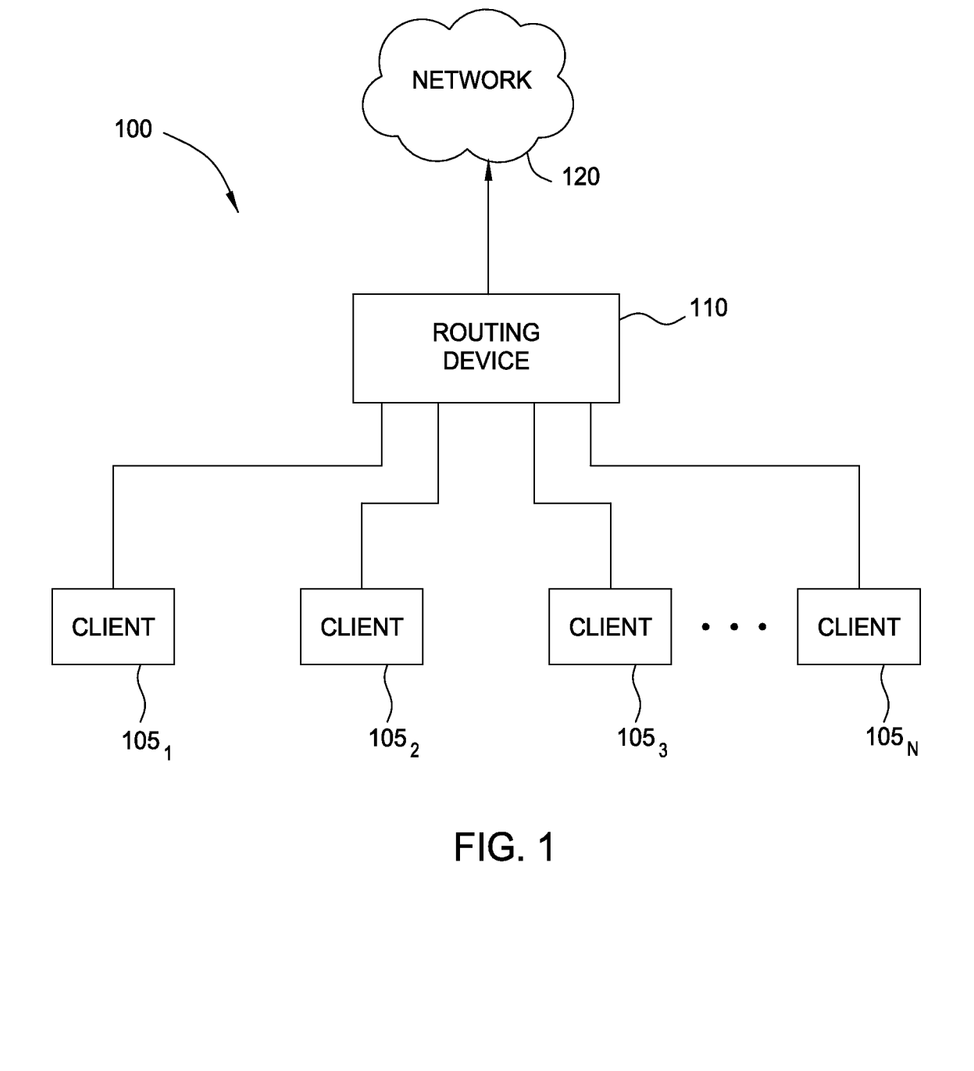
FIG. 1 illustrates an example ecomputing infrastructure configured to increase data access performance, according to certain embodiments of the present disclosure.

FIG. 1 illustrates an example computing infrastructure 100, configured according to certain embodiments of the present disclosure. As shown, a routing device 110 includes an uplink to a network 120. Note, the routing device may include multiple uplinks to the network 120 (e.g., multiple 10 Gb Ethernet ports). Additionally, the routing device 110 includes links to multiple clients $105_{1-N}$. The routing device 110 is generally configured to route network traffic to/from the network 120 for the connected client devices $105_{1-N}$. As described in greater detail below, the routing device 100 may include one or more memories and a scheduler configured to read/write data to the memories. For example, FIG. 2 is a block diagram further illustrating the routing device 110 of FIG. 1, according to certain embodiments of the present disclosure.

Figure 2:
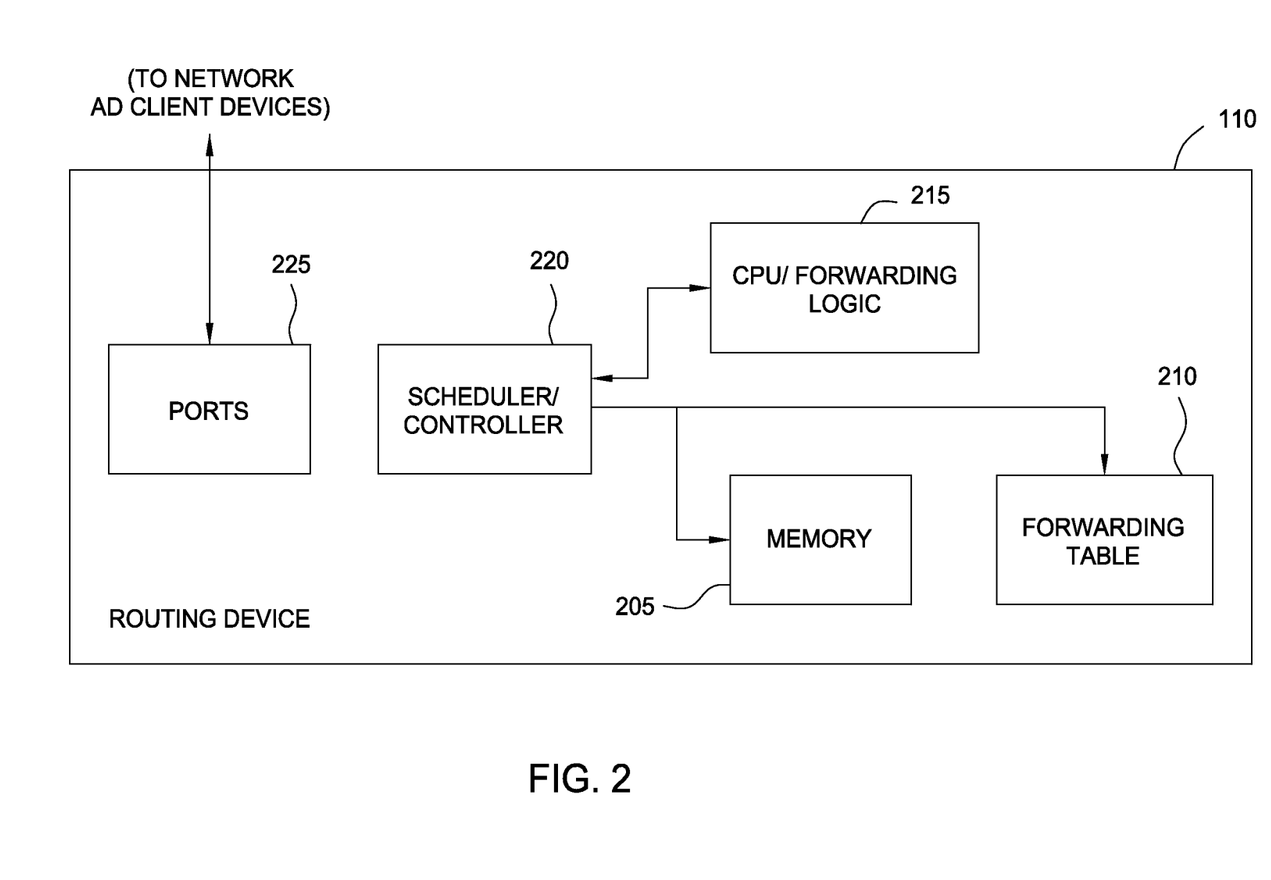
FIG. 2 is a block diagram illustrating an example of a routing device, according to certain embodiments of the present disclosure.

As shown in FIG. 2, the routing device 110 includes a memory 205, and a forwarding table 210, a central processing unit (CPU)/forwarding logic 215, a controller/scheduler 220 and ports 255. Of course, one of ordinary skill in the art will recognize that the depiction of a network routing device shown in FIG. 2 is simplified to highlight aspects of the disclosure and further, that, in practice, network devices may be configured with a variety of additional functions, features and components.

In this example, ports 225 include both upstream ports, such as one or more high-speed uplinks (e.g., 10 Gb) to another network and also includes ports used to connect a collection of clients to the routing device 110. The clients may be computing systems (e.g., servers in a data center) as well as other networking devices. CPU 215 provides a processing unit configured to forward traffic received over one of the ports 225. The scheduler/controller 220 is configured to control the follow of data being written to or read from the memory 205 and/or the forwarding table 210. For example, the controller 220 may write network data is received over one of the ports 225 to a buffer in the memory 205. In response, the CPU 215 may request that the controller 220 read a memory address from the forwarding table 210 in order to determine a port over which to forward the traffic. That is, the forwarding table 210 generally provides a lookup table mapping ports on the device to the address of a device connected to a given port (e.g., mapping a port ID to a MAC address of a network interface card).

In one embodiment, the forwarding table 210 may be implemented as a ternary content addressable memory (TCAM) and the memory 205 may be any combination of fixed or removable memory chips or modules (e.g., DRAM, SDRAM, SRAM). Further, as described in greater detail below, embodiments of the disclosure provide a variety of techniques for configuring the controller 220, memory 205 and/or forwarding table 210 in order in order to increase memory read performance and memory write performance.

Figure 3:
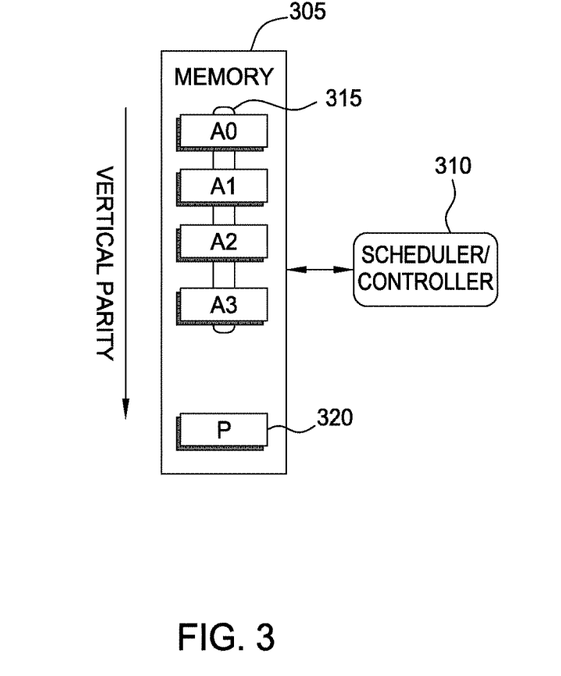
FIG. 3 illustrates an example of a memory configured to use a memory parity block to increase read performance, according to certain embodiments of the present disclosure.

For example, FIG. 3 illustrates an example of a memory 305 configured to use a memory parity 320 block to increase read performance, according to certain embodiments of the present disclosure. As shown, the memory 305 is partitioned into four equal-sized blocks 315, labeled A0, A1, A2 and A3. Each memory block 315 may include a read port which allows the scheduler/controller 310 to read an address in that block. A variety of approaches may be used to partition memory 305 into blocks 315, including, e.g., using a modulus or hash value and using uniform physical block splits.

In addition to the four blocks 315, the memory 305 also includes a parity block 320. The parity block 320 is sized to be same depth as each of the memory blocks 315 (whether partitioned logically or physically). The parity block 320 stores a parity result generated from the contents of a given address across all the blocks. As shown, the parity values run vertically, and a parity value may be obtained by performing a logical exclusive or (XOR) using the contents of an address in each of the blocks 315. The resulting parity value is stored in parity block 320. The parity value may be used to recover data for an address in the event of a failure in one of the blocks 315. The parity value P stored in block 320 may be represented mathematically as follows:

$$P = A0 \oplus A1 \oplus A2 \oplus A3 \oplus A4$$

where "$\oplus$" corresponds an XOR operation. The value for an address in a given block 320 can be recovered by XORing the contents of the other blocks with the parity value. For example, an address in A0 can be recovered as follows:

$$A0 = P \oplus A1 \oplus A2 \oplus A3 \oplus A4.$$

In one embodiment, the parity block 320 is used to provide an additional user read port, allowing the scheduler/controller 310 to perform two simultaneous reads from the same block to occur. That is, controller 310 has two available choices for reading a given memory address. First, the exact memory block in which an address is stored, and second, the remaining data and parity blocks.

In order to read two addresses simultaneously, the controller 310 first determines whether the addresses being read are present in different blocks 315. If yes, i.e., if no read collision occurs, than the controller 310 reads the contents of two different blocks. Otherwise, if a collision occurs (i.e., the reads are for different addresses in the same block 315)

then one address is read from the target block and the other is read using the non-target memory blocks and the parity block.

Figure 4:
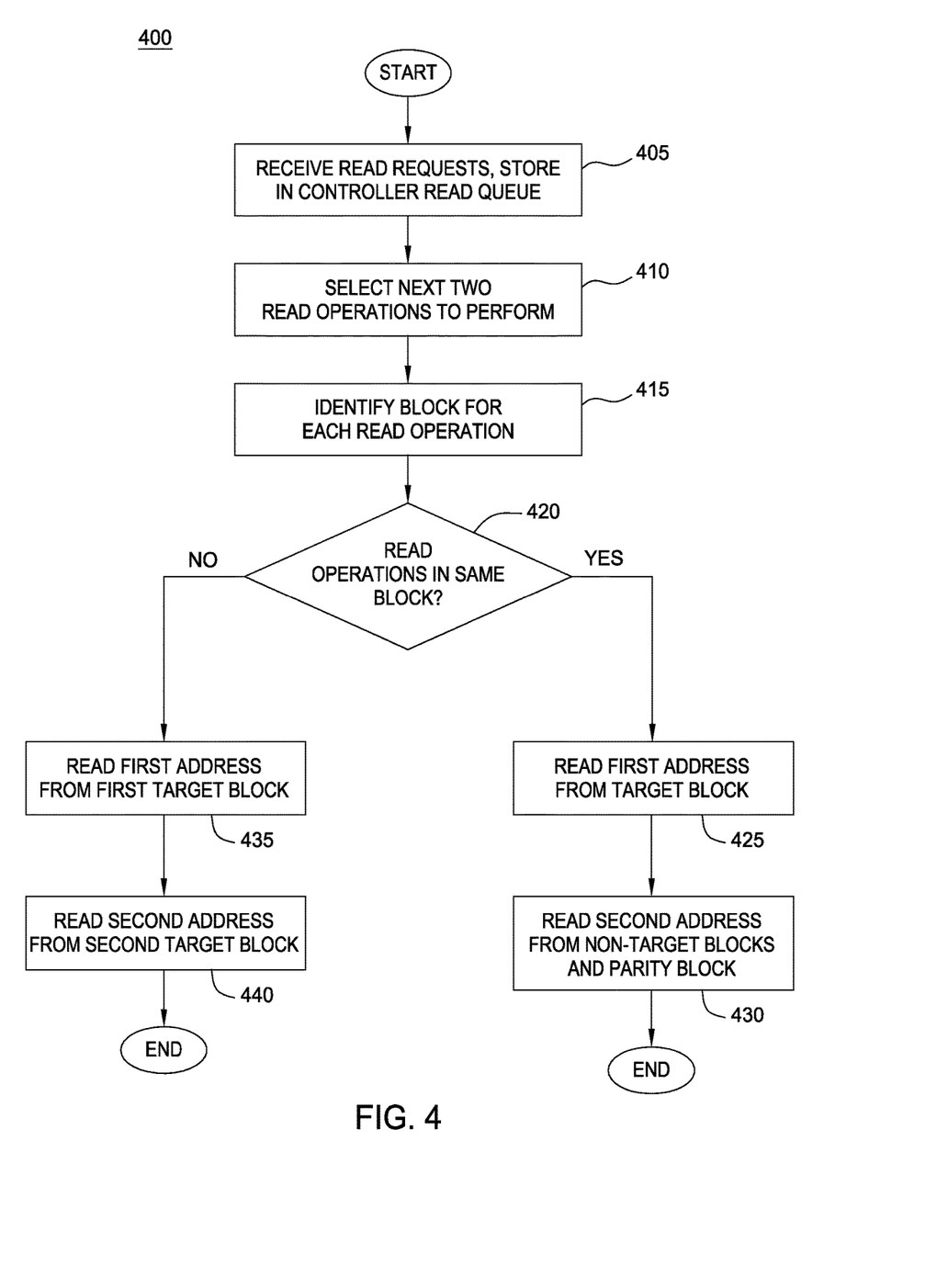
FIG. 4 illustrates a method for performing multiple read operations from a memory, according to certain embodiments of the present disclosure.

FIG. 4 illustrates a method 400 for performing multiple read operations from a memory, according to certain embodiments of the present disclosure. As shown, the method 400 begins at step 405, where the controller receives read requests. The requests may be stored in a read buffer associated with the controller. At step 410, the controller selects the next two read operations to perform. At step 415, the controller identifies a target block (logical or physical) associated with each of the two the read operations.

At step 420, the controller determines whether the two read operations target the same block. If not (i.e., if the read operations target different blocks), then at step 435, the controller reads a first address from a first target block and at step 440 reads a second address from a second target block. Otherwise, if the controller determines that the two read operations target the same block, then at step 425, the controller reads a first address from the target block common to both addresses. And at step 430, reads a second address from the target block by XORing the value from the identified address in each non-target block and the parity block. Thus, regardless of the whether two addresses target the same or different blocks, the memory controller can read two addresses during each read cycle.

Figure 5:
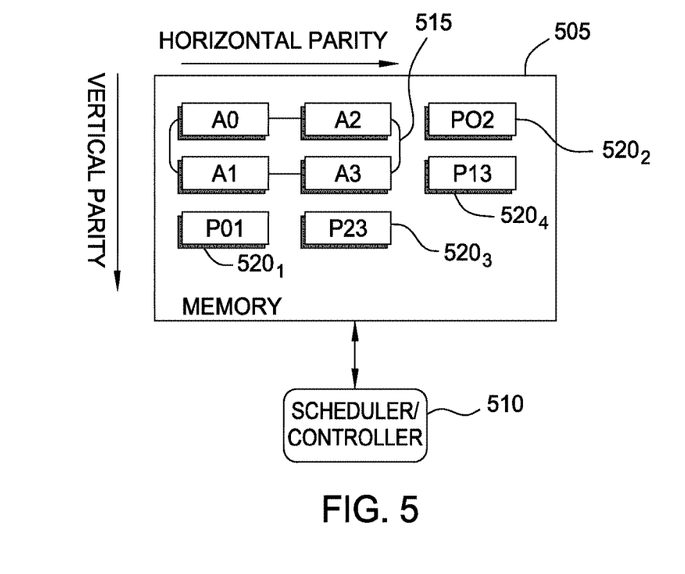
FIG. 5 illustrates an example of a memory configured to use memory parity blocks to increase read performance across multiple dimensions, according to certain embodiments of the present disclosure.

Further, the approach of using a parity block to increase read access performance may be extended to higher dimensions. For example, FIG. 5 illustrates an example of a memory 505 configured to use memory parity blocks 520 to increase read performance across multiple dimensions, according to certain embodiments of the present disclosure. As shown in FIG. 5, a memory 505 is partitioned into four blocks 515, labeled A0, A1, A2 and A3. Additionally, four parity blocks $520_{1-4}$ are used to determine a parity value from vertical or horizontal pairs of the blocks 515. For example, parity block $520_1$ (P01) provides a parity value computed from blocks A0 and A1. Similarly, parity block $520_2$ (P02) provides a parity value computed from blocks A0 and A2. More generally, each block 515 is a member of two parity combinations, one running vertically and one running horizontally. This arrangement allows memory controller 510 to read three separate addresses from a memory block 515 simultaneously. For example, to read three separate addressees from block A0, the controller 510 reads a first address in A0 directly, with the other two reads using the vertical and horizontal parity groups. That is, the controller 510 reads a second address as A0=P01⊕A1 and reads a third address as A0=P02⊕A2.

One of skill in the art will recognize that the parity block approach to increasing read performance discussed above has many possible arrangements and is not limited to an arrangement of memory blocks in square or rectangular arrays. Consider, e.g., an array of seven memory blocks, in such a case, five parity blocks could be used to achieve a tripling of read performance by ensuring that each of the seven memory blocks is associated with two distinct parity groups. That is, to allow each of seven memory blocks to participate in two distinct parity groups requires five parity blocks. Similarly, using eleven parity blocks would allow each of the seven memory blocks to participate in three distinct parity groups, resulting in a quadrupling of read performance. More generally, each one of n-fold increases in read performance requires an additional parity group for each memory block.

Figure 6:
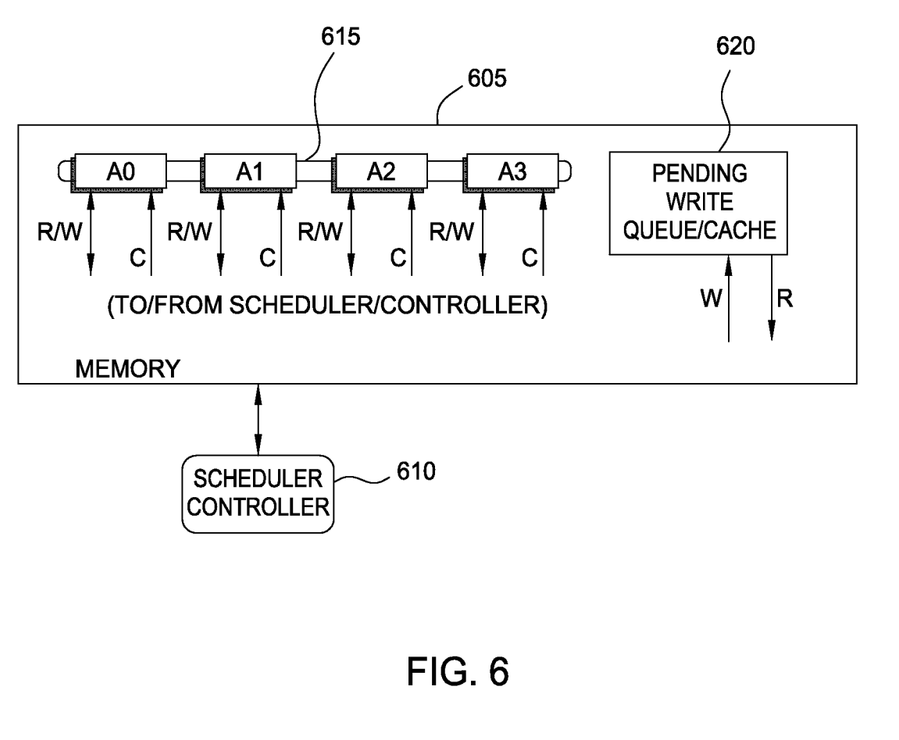
FIG. 6 illustrates an example of a memory configured to increase write performance using a pending write queue/cache, according to certain embodiments of the present disclosure.

In addition to using a parity block to increase memory read performance, embodiments of the disclosure may also be used to increase memory write performance using a pending write queue. For example, FIG. 6 illustrates an example of a memory 605 configured to increase write performance using a pending write queue/cache 620, according to certain embodiments of the present disclosure. As shown, the memory is partitioned into four equally sized blocks 615, labeled A0, A1, A2 and A3. Additionally, each block 615 includes a read/write line and a command line. The read/write lines allow the controller 610 to read or write data at one address in a given block 615 during each read/write cycle, depending on a command sent over that block's command line. One of ordinary skill in the art will recognize that configuring blocks 615 with the read write line and a command line generally corresponds to the structure of DRAM memory.

Assume the controller 610 is configured to perform two write operations for each read/write cycle. In such a case, when two write operations target different blocks, then each may be performed during the same read/write cycle. However, if two write operations share a common target block (i.e., a collision occurs), only one may be performed during a read/write cycle—halving the performance of the memory for writes to the same block 615.

In one embodiment, the memory 605 is extended to include a pending write queue/cache 620. The pending write queue/cache 620 is generally configured to be the same size as the blocks 615. As shown, the pending write queue/cache 620 includes both a read line and a write line. Thus, unlike the blocks 615, the controller 610 may perform a read and a write to the pending write queue/cache 620 during a single read/write cycle. In one embodiment, the pending write queue/cache 620 allows the controller 610 to perform two write operations for addresses in the same target block during a single read/write cycle. Specifically, the controller 610 may perform a first write operation by writing to the target block associated with an address. If a value for that address was valid in the cache, it is invalidated. At the same time, the controller 610 may perform a second write operation by writing data for the second address for the target block by writing to the pending write queue/cache.

On a subsequent read/write cycle, if no further read/writes occur to the target block, then data from the pending write queue/cache 620 may be flushed to the target block. If the controller 610 continues to perform write operations to the target block, then data for one address may be written to the target block and a data for a second address may be written to the pending write queue/cache 620 during each read/write cycle. Note, this results in a maximum of one-half of the addresses for any one of the blocks 615 being stored in the pending write queue/cache 620. Once a target block in blocks 615 becomes available, the controller may flush data from the pending write queue/cache 620 to the target block. The controller 610 may also perform read and write operations during a read/write cycle, using data from a target block and pending write queue/cache 620 as appropriate.

Figure 7:
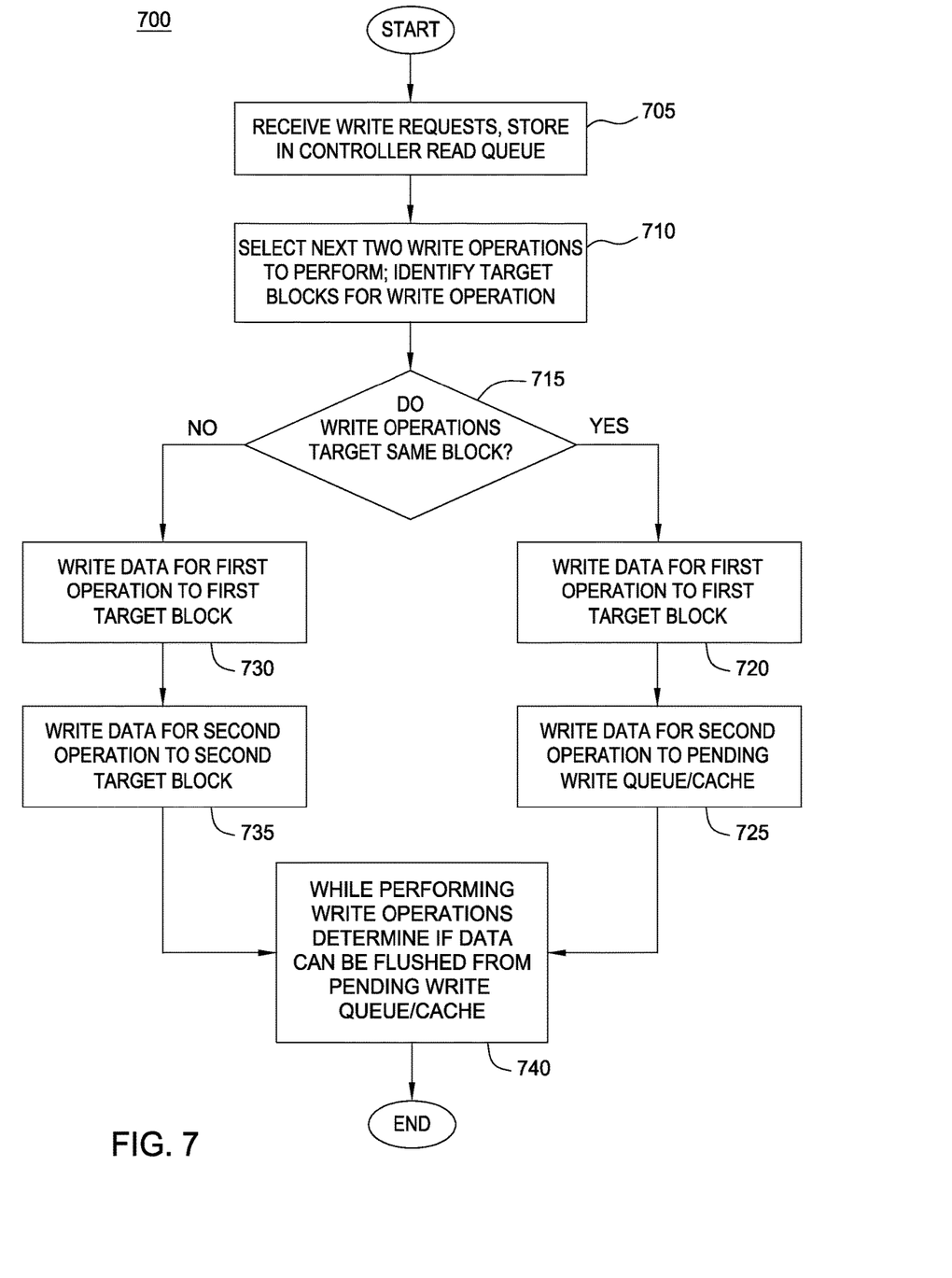
FIG. 7 illustrates a method for performing multiple write operations to a memory, according to certain embodiments of the present disclosure.

FIG. 7 illustrates a method 700 for performing multiple write operations to a memory, according to certain embodiments of the present disclosure. As shown, the method 700 begins at step 705, where the controller receives write requests. The write requests may be stored in a write buffer associated with the controller. At step 710, the controller selects the next two write operations to perform and identifies a target block (logical or physical) associated with each of the two the write operations. At step 715, the controller determines whether the two write operations target the same block. If not (i.e., if the write operations target different blocks), then at step 730, the controller writes data to a first address in a first target block and at step 735 writes a second address to a second target block.

Otherwise, if the controller determines that the two write operations target the same block, then at step 720, the controller writes a first address to the target block common to both addresses. And at step 725, writes a second address to the pending write queue/cache. In either case, the controller may perform steps 720 and 725 or steps 730 and 735 during a single read/write cycle. Further, at step 740, while performing the write operations, the controller may determine if data can be flushed from the pending write queue/cache. For example, assume two write operations are performed for addresses in block A0 of blocks 615 in FIG. 6. In such a case, one address is written to block A0 and one is written to the pending write queue/cache 620. At the same time, the controller 610 could flush an address to block A1 stored in the pending write queue/cache 620. Thus, regardless of the whether two addresses target the same or different blocks, the controller can write two addresses during each read/write cycle as well as potentially flush data to one of the blocks.

One of skill in the art will recognize that the pending write queue/cache 620 can be used to perform simultaneous read and write operations. For example, controller 610 may determine whether two operations target the same block as well as whether read data is available in the pending write queue/cache 620. Read operations are performed by reading from the pending write queue/cache 620 in case of a cache hit. Otherwise read operations are performed by reading the desired data block in blocks 615. If the two operations target the same block, then the write operation is performed by writing either the desired data block in blocks 615 in case of a read cache hit or the pending write queue/cache 620 in case of a read cache miss.

Figure 8:
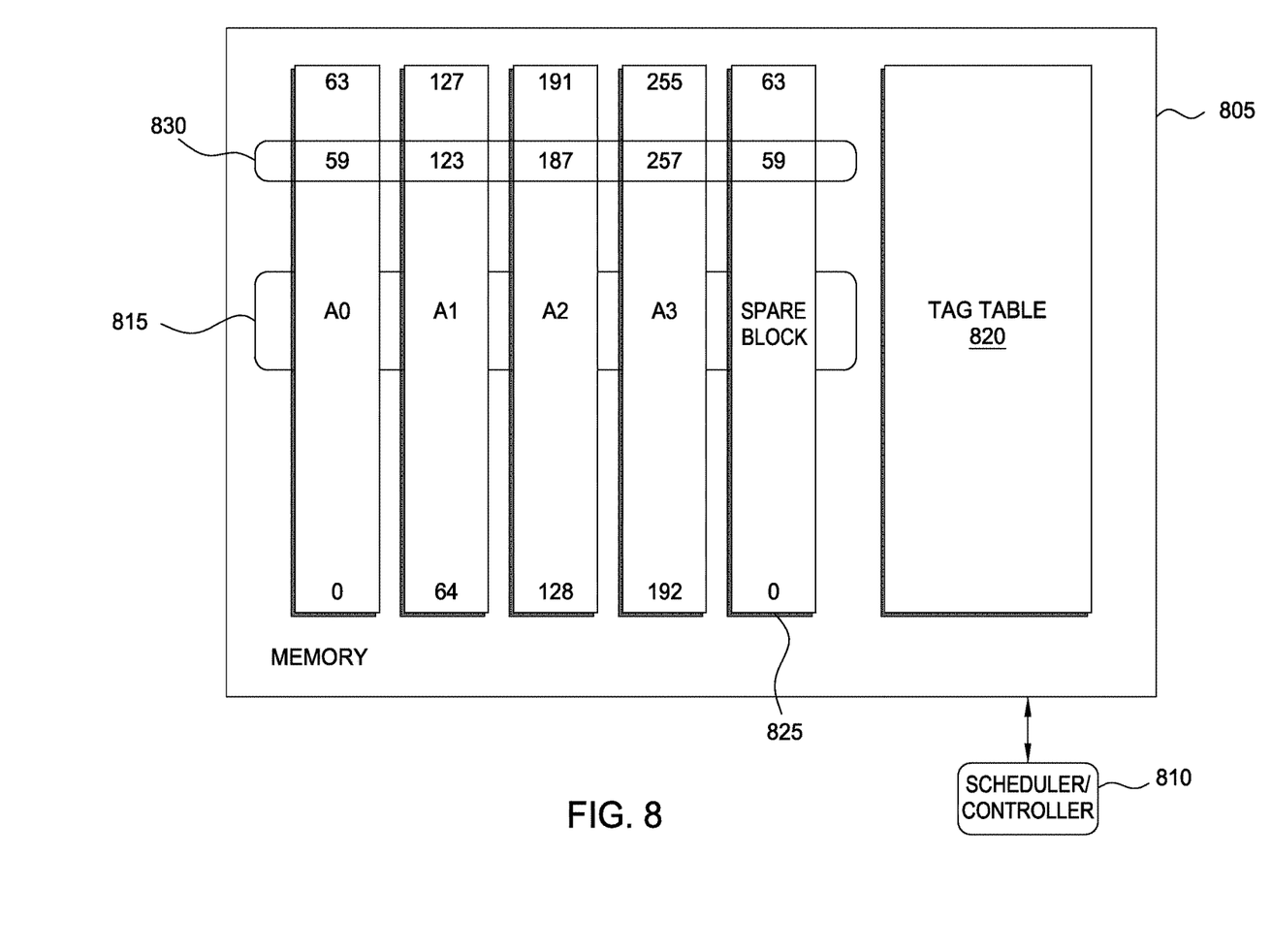
FIG. 8 illustrates an example architecture used to increase write performance in a set-associative memory, according to certain embodiments of the present disclosure.

In addition to increasing the write performance as just described, the write performance may also be increased by dividing the memory into blocks and then adding an extra memory block. For example, FIG. 8 illustrates an example architecture used to increase write performance according to certain embodiments of the present disclosure. As shown, a memory 805 is partitioned into four equal-sized blocks 815, labeled A0, A1, A2 and A3. In this example, each block 815 provides an address space of 64 values—resulting in a total depth of 256 useable addresses in memory 805. Corresponding addresses in each block forms a 4-way set. For example, the memory addresses at locations 59, 123, 187 and 251 together form a set. In this case, a set may be identified using six lower-order bits of an address in the 0-255 range. For example, the six-lower order bits of 59, 123, 187 and 251 are the same in binary—111011. The two higher-order bits 00, 01, 10 and 11 for addresses 59, 123, 187 and 251, respectively, become tags associated with the six lower-order bits 111011. In other words, any address in the set of 59, 123, 187 and 251 may be stored in an arbitrary block and the tags are stored in a tag table 820. When the set is read out, the tags are evaluated. If a particular block returns a tag value of binary 00, the address stored in that block is identified as 59; if a block returns a tag value of binary 01, the address stored in that block is 123, etc. Because the two most significant bits in the full 8 bit address are not used as physical address of memory 805, henceforth the full 8 bit address will be referred to as virtual address.

Additionally, memory 805 includes a spare block 825, also 64 addresses deep. The useable size of memory 805 remains 256; but using five blocks to store a 4-way set, as depicted for memory 805, guarantees that at least one location in any set is always unoccupied. And the spare block 825 creates an additional write port for the memory 805. That is, the spare block 825 ensures that scheduler/controller 810 can always perform two write operations during a given read/write cycle. The 4-way set-associative memory augmented with a $5^{th}$ memory block is henceforth referred to as 4-way+1 set-associative memory.

More generally, to gain a write port, a memory of useable depth of D may be partitioned into X blocks each with a depth of D/X. In the example of FIG. 8, X=4, D=256, and thus D/X=64. Accordingly, blocks 815 are each 64 addresses deep. Note, each block may also have the same bit-width W. Once partitioned into X blocks, a spare memory block of D/X depth and width W is added to the memory.

In one embodiment, the tag table 820 is used to identify whether the data stored in a given block 815 (e.g., one of blocks A0, A1, A2 and A3) or stored in spare block 825 is valid. Entries in the tag table 820 may include a valid bit for each of the blocks 815 and for the spare block 825. Entries in the tag table may also include space to store the most significant bits (the tag) of virtual addresses for a given set. That is, entries in the tag table 820 may indicate what virtual address is stored in a given block 815 (or spare block 825), if it is valid. For example, if an entry in the tag table 820 indicates the data in set 830 for the A0 blocks is valid, then the most significant bits (00, 01, 10 or 11) indicate which virtual memory address (59, 123, 187 or 251) is stored in the A0 block. Similarly, if the tag table 820 indicates that data for set 830 in the spare block 825 is valid, the most significant bits (00, 01, 10 or 11) in the tag table 820 indicate which virtual memory address (59, 123, 187 or 251) is stored in the spare block 825. That is, the most significant bits (00, 01, 10 and 11) provide a virtual address associated with a set. The virtual address bits are used to identify which block stores a given address value.

In one embodiment, each block 815 includes one write port or channel, but the spare block 825 allows the scheduler 810 to, effectively, gain an additional write port to the memory 805. As noted, the spare block 825 ensures that at least one location for a set is always invalid, as each 4-way+1 set includes four valid addresses (having most significant bits of 00, 01, 10 and 11), and the spare block 825 provides a fifth storage location. Thus, the spare block 825 allows the scheduler/controller 810 to support two write operations in parallel. The first write operation picks one of the blocks to which to write. Then the second write operation picks a block to which to write. If the second write operation happens to pick the same bank as the first write operation, a conflict occurs. In this case the second write operation is performed by identifying an alternative location in the tag table with a bit set to invalid, writing to that block, and updating the tag table 820. Because each 4-way+1 set is guaranteed of at least one invalid location, an alternative location can always be found.

For example, assume two write operations hit block A0 at address 16 and address 59 respectively. In such a case, the first write operation is written to block A0 at address 16. And the second write avoids block A0, since there is at least one unoccupied location in the set (assume block A3), the data for address 59 is written to block A3 instead. The tag table 820 is updated for the second write by clearing the valid bit for address 59 for block A0 (if present), and the tag value of 00 (corresponding to the high-order bits of address 59) is written to the tag table for block A3 and the valid bit for this entry is set.

Figure 9:
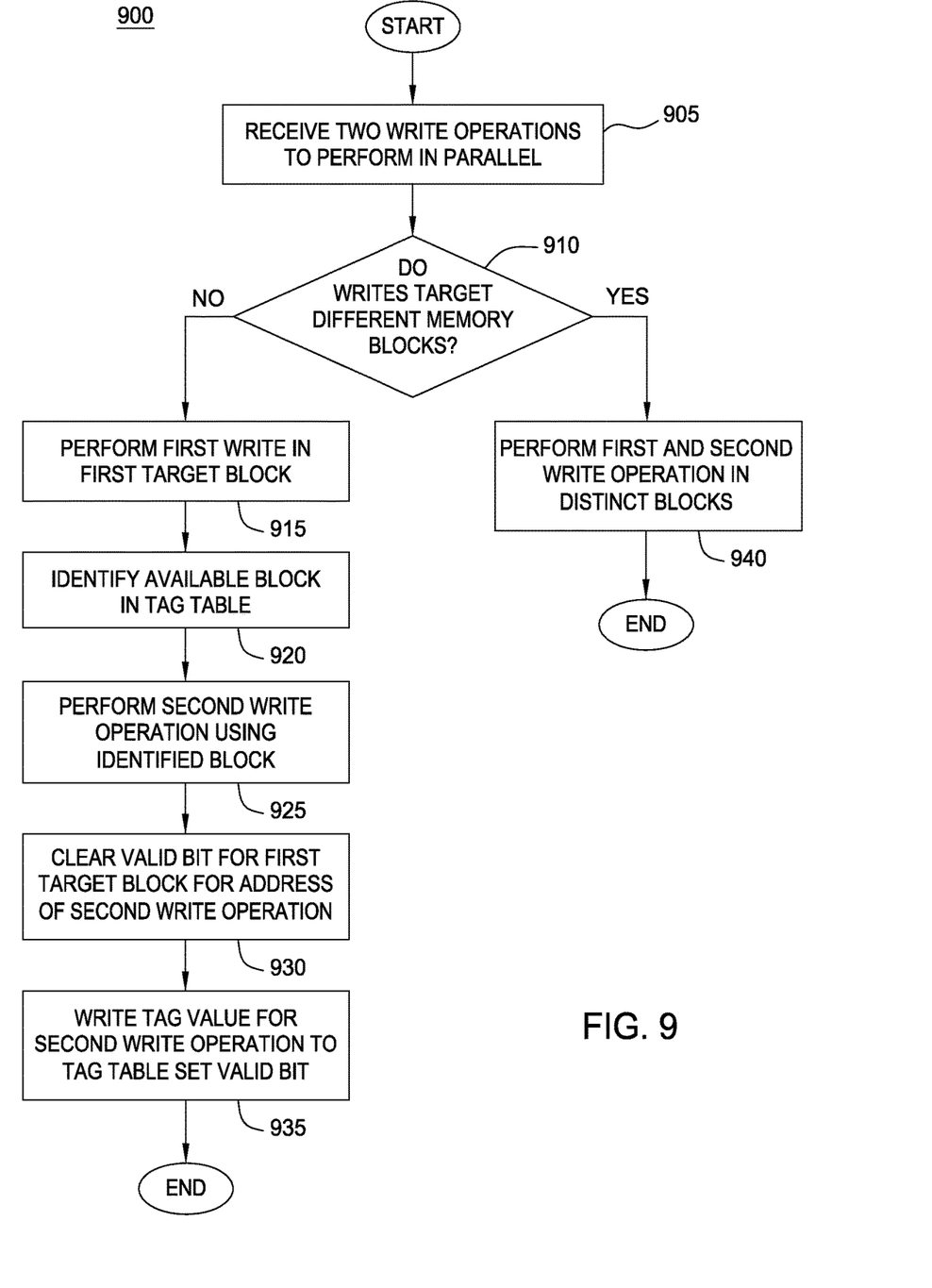
FIG. 9 illustrates a method for performing multiple write operations to a set-associative memory, according to certain embodiments of the present disclosure.

FIG. 9 illustrates a method 900 for performing multiple write operations to a set-associative memory, according to certain embodiments of the present disclosure. As shown, the method 900 begins at step 905, where a memory controller receives two write operations to perform in parallel. At step 910, the controller determines if the two write operations target different memory blocks. That is, the controller determines whether the writes are to different set addresses within the same block. If not (i.e., if the write operations target different blocks), then at step 940, the controller writes data to a first address in a first target block and writes a second address to a second target block.

Otherwise, at step 915, the controller performs a first write operation to an address in the target block. At step 920, the controller identifies an available block in the tag table. That is, the controller identifies a set associated with the second address. Using the example of FIG. 8, the controller could identify a set using the lower-order bits of 111011. Once identified, the controller identifies an entry for this set with an invalid bit, and at step 925, writes the data to the identified entry. At step 930, the controller clears the valid bit for the first target block for the address of the second write operation. At step 935, the controller writes the tag value (i.e., the higher-order bits of the memory address associated with the second write operation) to the tag table and sets the valid bit.

As described, the write performance of a set-associative memory may also be increased by adding an extra memory block. Additionally, the approaches described above may be further optimized for a variety of situations. For example, one optimization may be used for data buffer applications, such as packet storage and another may be tailored to optimize read-modify-write intensive applications, such as counters, statistics, etc. An example of each optimization follows.

Figure 10:
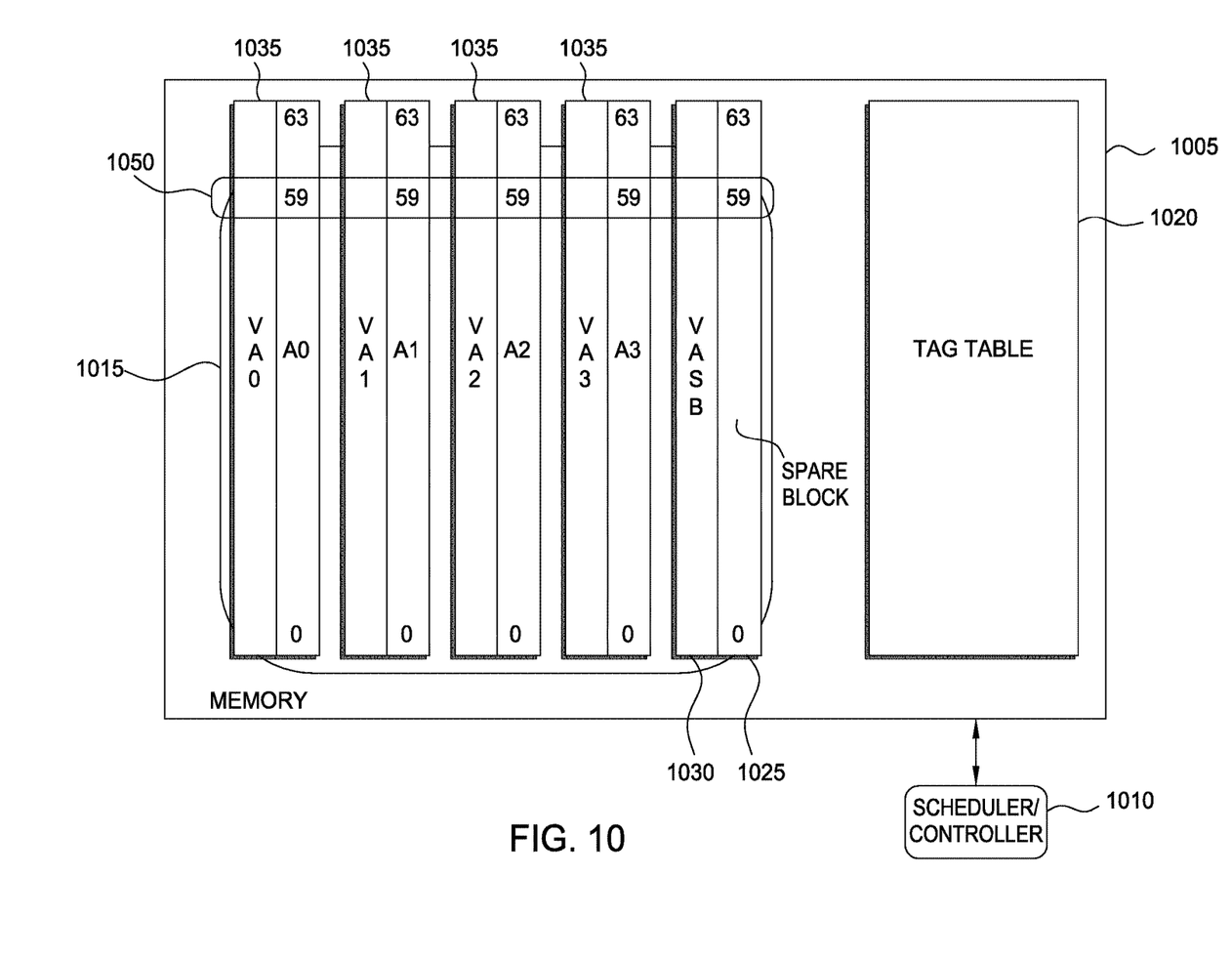
FIG. 10 illustrates another example architecture used to increase write performance in a set-associative memory, according to certain embodiments of the present disclosure.

FIG. 10 illustrates another example architecture used to increase write performance in a set-associative memory, according to certain embodiments of the present disclosure. Like memory 805 of FIG. 8, a memory 1005 is partitioned into four equal-sized blocks 1015, labeled A0, A1, A2 and A3. And each block 1015 provides an address space of 64 values—resulting in a total depth of 256 addresses in memory 1005, ranging from 0-255. Additionally, memory 1005 includes a spare block 1025, also 64 addresses deep. Like memory 805, using five blocks for a 4-way set-associative memory 1005 guarantees that at least one location is in a set is always unoccupied, and the spare block 1025 creates an additional write port for the memory 1005. That is, the spare block 1025 ensures that scheduler/controller 1010 can always perform two write operations during a given read/write cycle.

However, unlike memory 805 of FIG. 8, blocks 1015 each include a virtual address store 1035 and spare block 1025 includes a virtual address store 1030. In one embodiment, the virtual address stores 1030, 1035 are used to store the high-order bits of a virtual memory address (i.e., the tag) written to a given block. For example, set 1050 corresponds to lower order bits of address 59 (111011) in blocks A0, A1, A2 and A3 and in spare block 1025. The higher-order bits of a memory address indicate which of the address (59, 123, 187, 257) are stored in a given block. For example, assume data for virtual memory address 187 is stored in block A1. The lower order bits of 111011 identify the set and the higher order bits of 10 (associated with the memory address 187) are stored in the virtual address store VA1 of the A1 block.

The tag table 1020 indicates whether the data at a given block is valid. Thus, in this example, the tag table 1020 only needs to be 5 bits wide, 1 bit for the four blocks 1015 and 1 bit for spare block 1025. This approach reduces the amount of high-speed memory needed to implement the tag table 1025 to the number of blocks in the memory 1005. For buffering, the scheduler/controller 1010 performs write operations only to free locations in the blocks 1030, 1035. For buffering, it is assumed that a valid location is read, but once valid will not be written to again and another operation is used to drain data from the buffer memory. Because the virtual address in virtual address stores 1030, 1035, are only needed for read operations, they are not written to the tag table 1020. That is, the write operation only needs the valid flags to identify a block to perform a given write operation. Accordingly, the write operations store a virtual address with data record in the (cheaper) main memory, leaving only V flag in the faster memory.

Further, the approach of using an additional memory block to increase write access performance may be extended to even higher throughput. Instead of 4-way+1, in which case one additional block is added to a 4-way set, two additional blocks can be added to the set, forming a 4-way+2 set. This set guarantees that at least two locations are invalid. This allows the scheduler to perform three simultaneous write operations—the first write operation applies to the desired block; the second write operation access an alternative invalid block in case of conflict, and the third write operation yet another invalid block that is different from the two blocks already targeted. Because each set is guaranteed of three invalid locations, it is always possible to find an invalid location that is different from the other two. This can be generalized into X-way+N set-associative memory providing N+1-fold write performance.

Figure 11:
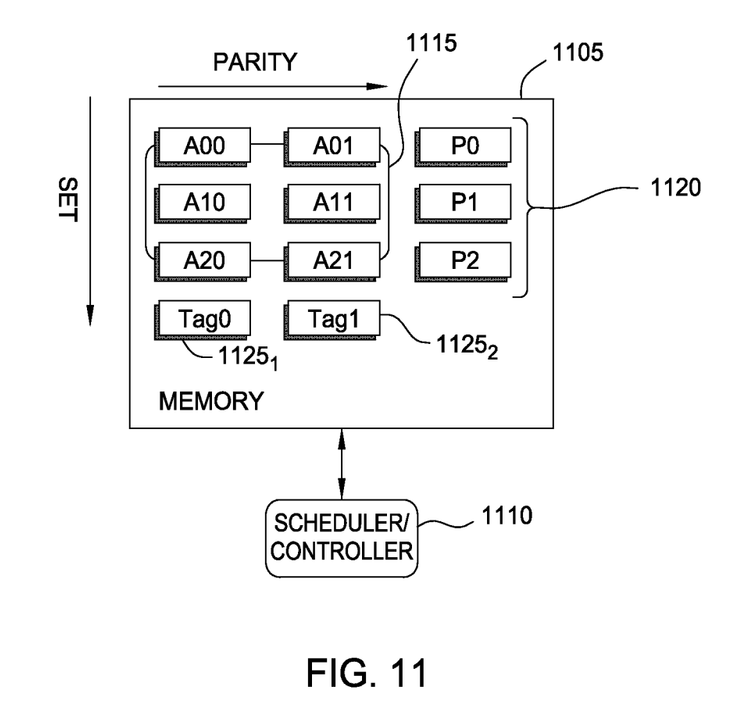
FIG. 11 illustrates an example memory used to increase read and write performance for read-modify-write operations, according to certain embodiments of the present disclosure.

FIG. 11 illustrates an example of a memory 1105 used to increase read and write performance for read-modify-write operations, according to certain embodiments of the present disclosure. In this example, a memory 1105 is partitioned into six blocks 1115, labeled A00, A01, A10, A11, A20 and A21. Additionally, three parity blocks 1120 are used to determine a parity value from horizontal pairs of blocks 1115. For example, parity block P0 provides a parity value computed from blocks A00 and A01. Similarly, parity block P1 provides a parity value computed from blocks A10 and A11. Thus, the scheduler/controller 1110 can increase the read performance of memory 1105 using the parity blocks 1120, as discussed above.

At the same time, blocks A00 and A10 form a two-way set-associative cache with tag data stored in tag block $1125_1$ (Tag0) and blocks A01 and A11 form a two-way set associate cache with tag data stored in tag block $1125_2$ (Tag1). Blocks A20 and A21 provide a spare block for increasing the performance of write operations by augmenting the two-way sets into two-way+1 sets. Thus, the scheduler/controller 1110 can increase the write performance of memory 1105 using the spare blocks A20 and A21 and the Tag tables $1125$, as discussed above. Finally, parity block P2 is added to provide parity computed from blocks A20 and A21. This arrangement is tailored to facilitate read-modify-write intensive applications, such as counters, dynamic tree structures, etc.

As is known, counters are useful for traffic metering (reporting, policing, shaping, etc.). And counters generally perform a read-modify-write operation to a single location. That is, a counter is implemented by reading a current value (X) in a memory location, calculating a new value, e.g., X+1 and writing the new value back to the same memory address. Thus, one read port and one write port is needed to support each counter operation. In one embodiment, the memory 1105 is configured to allow an extra memory operation to be performed in parallel.

Dynamically updated tree structures are useful for sorting or fast search on a set of numeric keys. For example, one popular tree type structures includes a heapsort, binary search tree, etc. Typical operations on the tree include locating a key and delete it from the tree, and inserting a new key value. These operations involve reading some the contents of some tree nodes and modify the same nodes after the insertion/deletion.

If two read-modify-write operations are performed using addresses in different blocks, the read-modify-write operations may be performed in parallel without conflict. However, if two read-modify-write operations hit the same block, the two read-modify-write operations require two reads and two writes to occur in parallel. For example, assume both ops land in block A00 causing a conflict. In such a case, the two read-modify-write operations may be performed in parallel as follows: A first read happens in block A00. A second read may be performed using A01 and P0. That is, the second read occurs by using the parity read scheme discussed above.

The second write is performed to block A00. Additionally, the parity value in P0 is updated (i.e., P0=A00⊕A01). The first write avoids block A00; instead a free block is identified in the set for the write operation (assume block A20 is selected as a result). In such a case, data for the first write operation is stored in A20. Additionally, the parity value in P2 is updated (i.e., P0=A20⊕A21). Tag 0 is read twice and written once (to one of the read addresses), so the tag table can be implemented using 2-port memory. In order for the 2-port memory to gain an extra read port, the read parity method as described in [0034] may be used.

In sum, embodiments described herein provide techniques for increasing data access performance for a memory device. In various embodiments, a scheduler/controller is configured to manage data as it read from (or written to) a memory. Read access is increased by partitioning a memory into a group of sub-blocks, associating a parity block with the sub-blocks, and accessing the sub-blocks to read data as needed. Addresses within the same block may occur simultaneously—data for one address being read from a sub-block in which the address is located and data for a second address in that sub-block being read using the combination of the other sub-blocks and the parity block.

Write speeds may be improved by adding a pending write buffer to a group of memory sub-blocks. Such a buffer may be sized to be equal to the group of memory sub-blocks. The pending write buffer is used to handle collisions for write accesses to the same block, allowing two simultaneous writes to any regular memory block to occur. This buffer serves as a pending write queue (and cache for reads that occur prior to a flush). In the context of some embodiments described herein, the memory stores a forwarding table used by a network device, and whether data is written to the actual memory block or in the pending write buffer depends on the address specified in either an SRAM storing tag information or content addressable memory (CAM) lookup. The pending write buffer is sized to accommodate worst-case back-to-back collisions for write accesses to the same block.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A method for performing multiple write operations, in parallel, to a set-associative memory, comprising:
   determining that a first and a second write operation are directed to a first block in the set-associative memory, wherein the set-associative memory includes at least a plurality of blocks, a spare block, and a tag table;
   performing the first write operation by writing data to the first block at a first memory address; and
   in parallel to performing the first write operation:
      identifying a second block selected from the plurality of blocks and the spare block, excluding the first block,
      performing a second write operation by writing data to the second block at a second memory address, and
      updating the tag table to indicate the second write operation was performed by writing to the second block, wherein updating the tag table comprises clearing a first valid bit corresponding to the first block and setting a second valid bit corresponding to the second block, and wherein the tag table consists of a plurality of valid bits corresponding to the plurality of blocks and the spare block.

2. The method of claim 1, wherein updating the tag table further comprises:
   writing a virtual address corresponding to the second write operation to the tag table.

3. The method of claim 2, wherein the virtual address comprises a set of higher-order bits associated with the second memory address.

4. The method of claim 1, wherein performing the second write operation further comprises writing a virtual address to the second block along with the data associated with the second write operation.

5. The method of claim 1, wherein updating the tag table to indicate the second write operation was performed by writing to the second block comprises clearing the first valid bit corresponding to the first block while maintaining any additional bits in the tag table corresponding to the first block in their previous states.

6. The method of claim 1, wherein the second block comprises a virtual address store and wherein performing the second write operation by writing data to the second block further comprises writing at least a portion of a virtual address corresponding to the second write operation to the virtual address store of the second block without writing the portion of the virtual address to the tag table.

7. The method of claim 6, wherein the width of the tag table matches a number of blocks in the plurality of blocks plus the spare block.

8. A non-transitory computer-readable storage medium storing code for execution by a central processing unit (CPU), wherein the code, when executed by the CPU, performs an operation for performing multiple write operations, in parallel, to a set-associative memory, the operation comprising:

determining that a first and a second write operation are directed to a first block in the set-associative memory, wherein the set-associative memory includes at least a plurality of blocks, a spare block, and a tag table;

performing the first write operation by writing data to the first block at a first memory address; and in parallel to performing the first write operation:
identifying a second block selected from the plurality of blocks and the spare block, excluding the first block,
performing a second write operation by writing data to the second block at a second memory address, and
updating the tag table to indicate the second write operation was performed by writing to the second block, wherein updating the tag table comprises clearing a first valid bit corresponding to the first block and setting a second valid bit corresponding to the second block, and wherein the tag table consists of a plurality of valid bits corresponding to the plurality of blocks and the spare block.

9. The computer-readable storage medium of claim 8, wherein updating the tag table further comprises:
writing a virtual address corresponding to the second write operation to the tag table.

10. The computer-readable storage medium of claim 9, wherein the virtual address comprises a set of higher-order bits associated with the second memory address.

11. The computer-readable storage medium of claim 8, wherein performing the second write operation further comprises writing a virtual address to the second block along with the data associated with the second write operation, wherein the virtual address comprises a set of higher-order bits associated with the second memory address.

12. A system, comprising:
a set-associative memory partitioned into a plurality of blocks, including at least one spare block; and
a memory controller configured to perform multiple write operations to the set-associative memory, in parallel, by performing an operation, comprising:
determining that a first and a second write operation are directed to a first block in the set-associative memory, wherein the set-associative memory includes at least a plurality of blocks, a spare block, and a tag table, and
performing the first write operation by writing data to the first block at a first memory address, and
in parallel to performing the first write operation:
identifying a second block selected from the plurality of blocks and the spare block, excluding the first block,
performing a second write operation by writing data to the second block at a second memory address, and
updating the tag table to indicate the second write operation was performed by writing to the second block, wherein updating the tag table comprises clearing a first valid bit corresponding to the first block and setting a second valid bit corresponding to the second block, and wherein the tag table consists of a plurality of valid bits corresponding to the plurality of blocks and the spare block.

13. The system of claim 12, wherein updating the tag table comprises:
writing a virtual address corresponding to the second write operation to the tag table.

14. The system of claim 13, wherein the virtual address comprises a set of higher-order bits associated with the second memory address.

* * * * *